(12) United States Patent
Gottshall et al.

(10) Patent No.: US 7,065,152 B2
(45) Date of Patent: Jun. 20, 2006

(54) CONTROLLER AREA NETWORK USING TRANSFORMERS

(75) Inventors: Paul Gottshall, Washington, IL (US); Mike Armstrong, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 190 days.

(21) Appl. No.: 10/281,254

(22) Filed: Oct. 28, 2002

(65) Prior Publication Data

US 2003/0123263 A1 Jul. 3, 2003

Related U.S. Application Data

(60) Provisional application No. 60/342,371, filed on Dec. 27, 2001.

(51) Int. Cl.
*H04B 15/00* (2006.01)

(52) U.S. Cl. ..................... 375/285; 307/10.1
(58) Field of Classification Search ............. 307/10.1; 375/285
See application file for complete search history.

(56) References Cited

U.S. PATENT DOCUMENTS

| | | | | |
|---|---|---|---|---|
| 4,229,175 A | * | 10/1980 | Knaflic et al. ............. 8/94.17 |
| 4,609,904 A | * | 9/1986 | Paine ..................... 307/10.1 |
| 4,747,451 A | | 5/1988 | Adams, Jr. et al. |
| 4,748,345 A | | 5/1988 | Landgraf |
| 4,903,182 A | * | 2/1990 | Pilukaitis et al. .............. 363/19 |
| 4,920,562 A | * | 4/1990 | Hird et al. ................... 379/132 |
| 5,307,048 A | | 4/1994 | Sonders |
| 5,321,597 A | | 6/1994 | Alacoque |
| 5,430,632 A | | 7/1995 | Meszlenyi |
| 5,460,124 A | * | 10/1995 | Grimsley et al. ........... 119/721 |
| 5,550,412 A | | 8/1996 | Anneser |
| 5,701,068 A | * | 12/1997 | Baer et al. ................... 320/119 |
| 5,737,595 A | * | 4/1998 | Cohen et al. ............... 707/100 |
| 5,799,040 A | * | 8/1998 | Lau ............................. 375/258 |
| 5,815,380 A | | 9/1998 | Cuk et al. |
| 5,880,939 A | | 3/1999 | Sardat |
| 5,910,746 A | | 6/1999 | Fordyce |
| 5,923,024 A | | 7/1999 | Wray |
| 5,953,681 A | * | 9/1999 | Cantatore et al. ............. 702/31 |
| 6,262,905 B1 | * | 7/2001 | Zhang et al. ................ 363/127 |
| 6,282,668 B1 | * | 8/2001 | Neudecker .................. 713/324 |
| 6,324,044 B1 | * | 11/2001 | Teggatz et al. .............. 361/119 |
| 6,356,099 B1 | * | 3/2002 | Lee et al. ...................... 326/24 |
| 6,407,691 B1 | * | 6/2002 | Yu .............................. 341/155 |
| 6,505,072 B1 | * | 1/2003 | Linder et al. ................. 607/32 |
| 6,515,378 B1 | * | 2/2003 | Drummond et al. ....... 307/10.1 |
| 6,525,647 B1 | * | 2/2003 | Calamatas .................. 340/5.8 |
| 6,549,014 B1 | * | 4/2003 | Kutkut et al. ............... 324/426 |
| 6,650,622 B1 | * | 11/2003 | Austerman et al. ......... 370/241 |
| 2001/0008548 A1 | * | 7/2001 | Miller et al. ................ 375/258 |
| 2001/0033502 A1 | * | 10/2001 | Blair et al. ................... 363/65 |
| 2002/0019983 A1 | * | 2/2002 | Emsley et al. .............. 725/107 |
| 2002/0114173 A1 | * | 8/2002 | Hosotani et al. .............. 363/19 |
| 2002/0140433 A1 | * | 10/2002 | Lawson et al. ............. 324/509 |
| 2003/0048006 A1 | * | 3/2003 | Shelter et al. ................ 307/64 |
| 2003/0080772 A1 | * | 5/2003 | Giacomini et al. ......... 324/771 |

* cited by examiner

*Primary Examiner*—Brian Sircus
*Assistant Examiner*—Brett Squires
(74) *Attorney, Agent, or Firm*—Finnegan,Henderson, Farabow,Garrett&Dunner

(57) ABSTRACT

A controller area network (CAN) data link is provided including a first node, a second node, and a transformer circuit connected between the first and second nodes to provide electrical isolation. The transformer circuit provides the requisite electrical isolation and is reliable under high temperatures.

16 Claims, 1 Drawing Sheet

CONTROLLER AREA NETWORK USING TRANSFORMERS

CROSS REFERENCE TO RELATED APPLICATIONS

This application claims the benefit of U.S. Provisional Application No. 60/342,371, filed Dec. 27, 2001, the contents of which are hereby incorporated by reference.

TECHNICAL FIELD

The present invention relates generally to controller area networks (CANs), and more particularly to a CAN implementation including a transformer for isolation.

BACKGROUND

Controller area networks are used in a number of industries, such as the automotive industries, for providing connections between simple industrial devices, such as sensors or actuators, and higher-level devices, such as an electronic control module (ECM). A standard implementation of an isolated CAN data link is described in "Volume I: DeviceNet Communication Model and Protocol," Open DeviceNet Vendor Association, Inc., Release 2.0, 1997, p. 1—1. A standard CAN data link may include a CAN controller, a transceiver, an isolation module, and an isolated power supply. The CAN controller includes a device that handles incoming and outgoing CAN messages. The CAN controller may be part of a microprocessor or peripheral. The transceiver includes a bus driver and/or receiver and is connected on one side to the CAN and on the other side to the CAN controller via the isolation module. The isolation module isolates control logic (such as the CAN controller) from noise, voltage surges, and spikes. The isolation module typically includes optocouplers, which may use diodes. The isolated power supply provides voltage to both the transceiver and the isolation module.

The use of optocouplers for electrical isolation is relatively expensive. Nonetheless, the standard implementation of the isolated CAN data link, using optocouplers for isolation, can be effective in certain applications. There are, however, situations when the standard implementation is insufficient. In particular, the conventional CAN data link may become unreliable at high heats because the optocoupler malfunctions. Most optocouplers cannot function reliably at higher operating temperatures, such as 120° C. In automotive applications, temperatures of up to 120° C. may occur, for example, due to mud build-up or other factors. In order to counter this problem, the industry standard currently uses hermetic sealing of the optocouplers. Another option is to use fuel coolant as a heat sink. Both of these methods are, however, expensive to implement.

Thus, the prior art does not provide an inexpensive isolation design that can be utilized in all working environments. The present invention is directed to overcoming one or more of the problems or disadvantages associated with the prior art.

SUMMARY OF THE INVENTION

In one aspect of the present invention, a controller area network (CAN) data link is provided including a first node, a second node, and a transformer circuit connected between the first and second nodes to provide electrical isolation.

In another aspect of the invention, a method is provided for providing electrical isolation in a controller area network. A first and a second node are provided. A transformer circuit is also provided. A first end of the transformer circuit is coupled with the first node. A second end of the transformer circuit is coupled with the second node.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate an exemplary embodiment of the invention and together with the description, serve to explain the principles of the invention. In the drawings.

DETAILED DESCRIPTION

Figure 1:
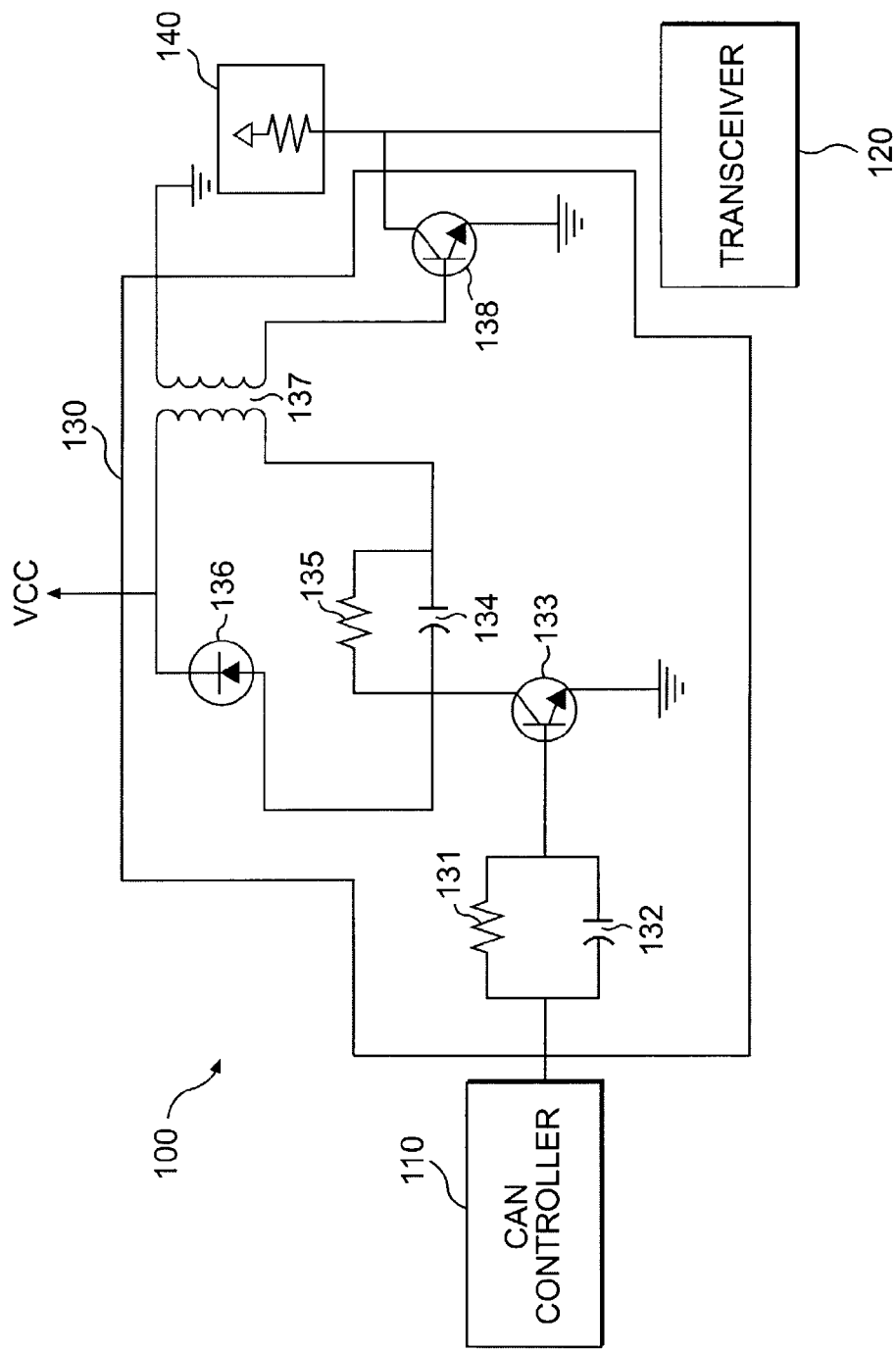
FIG. 1 is a schematic diagram of an isolated CAN data link, consistent with one exemplary embodiment of the present invention.

FIG. 1 illustrates an exemplary isolated CAN data link 100, consistent with one exemplary embodiment of the present invention. CAN data link 100 includes a first node, such as a CAN controller 110, a second node, such as a transceiver 120, an isolation module 130, and an isolated power supply 140. CAN controller 110 generally functions as described above. Components of the isolated CAN data link may be implemented using DeviceNET CAN components, or other suitable commercial or proprietary components. DeviceNET components are one type of commercially available CAN components. For example, CAN controller 110 of the exemplary embodiment may be implemented by DeviceNET component 82527, or any other suitable device. Transceiver 120 also generally functions as described above and may be implemented with DeviceNET component 82C251, or any other suitable device.

In one embodiment of the invention, isolation module 130 may be implemented using a transformer circuit, which may include, for example, two R-C circuits 131–132 and 134–135, two transistors 133 and 138, an LED 136, and a transformer 137. Implementation of the R-C circuits and the LED are known in the art. The transistors 133 and 138 may be implemented by any suitable transistors, such as, MMBT2369s (available from, e.g., Fairchild Semiconductor®), which are used for switching applications. These transistors 133 and 138 may include NPN transistors, operating as current amplifiers, although any suitable device may be used. The transformer 137 may be implemented by any appropriate transformer, such as, for example, an Elytone Electronics transformer as is typically used in telephone line applications. By means of example only, the exemplary embodiment uses a YT-6561 Transformer (180 uH, 0.9 ohms).

By reference to FIG. 1, one end of R-C circuit 131–132 is coupled with CAN controller 110. The other end is coupled with the base of transistor 133. The emitter of transistor 133 is grounded and the collector is coupled with one end of R-C circuit 134–135. Also coupled with the collector and the same end of R-C circuit 134–135 is one end of a diode 136. The other end of R-C circuit 134–135 is coupled with one edge of the transformer 137. The other end of diode 136 is coupled with the other edge of the transformer 137 and to a voltage VCC. One edge of the other side of the transformer 137 is grounded. The other edge of that side of the transformer 137 is coupled with the base of transistor 138. The emitter of transistor 138 is grounded and the collector of transistor 138 is coupled with transceiver 120 and to isolated voltage supply 140. These components operate so as to isolate logic components from noise, voltage surges, and spikes.

INDUSTRIAL APPLICABILITY

By using transformers rather than optocouplers in the isolated CAN data-link, the CAN is less susceptible to failure or unreliability at high temperatures. Further, transformers are generally less expensive than optocoupler devices. The system, however, still provides sufficient electrical isolation as may be required in the industry, such as by the DeviceNET standards. While the DeviceNET CAN components and standards have been illustrated here, it should be understood that the present invention is applicable to other CAN devices and standards.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A controller area network (CAN) data link, comprising:
   means for sending and receiving CAN messages;
   controller means for controlling CAN messages; and
   a circuit comprising:
      a transformer for providing electrical isolation;
      a first transistor coupled to a first R-C circuit and a second R-C circuit and coupled between the transformer and the controller means; and
      a second transistor coupled between the transformer and the sending and receiving means.

2. The CAN data link of claim 1, wherein the first R-C circuit is coupled between the first transistor and the controller means and the second R-C circuit is coupled between the first transistor and the transformer.

3. A controller area network (CAN) data link, comprising:
   means for sending and receiving CAN messages;
   controller means for controlling CAN messages; and
   a circuit comprising:
      transformer means for providing electrical isolation;
      a first transistor coupled to a first R-C circuit and a second R-C circuit and coupled between the transformer means and the controller means, wherein the first R-C circuit is coupled between the first transistor and the controller means and the second R-C circuit is coupled between the first transistor and the transformer means;
      a second transistor coupled between the transformer means and the sending and receiving means; and
      a diode coupled to the second R-C circuit and a voltage supply.

4. A controller area network (CAN) data link, comprising:
   means for sending and receiving CAN messages;
   controller means for controlling CAN messages; and
   a circuit comprising:
      transformer means for providing electrical isolation;
      a first transistor coupled to a first R-C circuit and a second R-C circuit and coupled between the transformer means and the controller means, wherein the first R-C circuit is coupled between the first transistor and the controller means and the second R-C circuit is coupled between the first transistor and the transformer means; and
      a second transistor coupled between the transformer means and the sending and receiving means,
      wherein an emitter of the first transistor is coupled with a ground, an emitter of the second transistor is coupled with a ground, and a side of the transformer means is coupled with a ground.

5. A controller area network (CAN) data link, comprising:
   a first node;
   a second node; and
   a transformer circuit coupled between the first and second nodes to provide electrical isolation, wherein the transformer circuit includes:
      a first R-C circuit having a first and a second end, wherein the first end is coupled with the first node;
      a first transistor, wherein the second end of the first R-C circuit is coupled with a first node of the first transistor and a second node of the first transistor is coupled with ground;
      a second R-C circuit having a first and a second end, wherein the first end of the second R-C circuit is coupled with a third node of the first transistor;
      a diode having a first and a second end, wherein the first end of the diode is coupled with the first end of the second R-C circuit and the second end of the diode is coupled with a voltage supply;
      a transformer having a first side and a second side, wherein a first end of the first side is coupled with the second end of the diode, a second end of the first side is coupled with the second end of the second R-C circuit, and a first end of the second side is coupled with ground; and
      a second transistor, wherein a first node of the second transistor is coupled with a second end of the second side of the transformer, a second node of the second transistor is coupled with ground, and a third node of the second transistor is coupled with the second node.

6. The CAN data link of claim 5, wherein the first node includes a CAN controller.

7. The CAN data link of claim 5, wherein the second node includes a transceiver.

8. The CAN data link of claim 7, wherein the second node further includes an isolated voltage supply.

9. A controller area network (CAN) data link, comprising:
   a first node;
   a second node; and
   a transformer circuit coupled between the first and second nodes to provide electrical isolation, wherein the transformer circuit includes:
      a first R-C circuit having a first and a second end, wherein the first end is coupled with the first node;
      a first transistor, wherein the second end of the first R-C circuit is coupled with a base of the first transistor and an emitter of the first transistor is coupled with ground;
      a second R-C circuit having a first and a second end, wherein the first end of the second R-C circuit is coupled with a collector of the first transistor;
      a diode having a first and a second end, wherein the first end of the diode is coupled with the first end of the second R-C circuit and the second end of the diode is coupled with a voltage supply;
      a transformer having a first side and a second side, wherein a first end of the first side is coupled with the second end of the diode, a second end of the first side is coupled with the second end of the second R-C circuit, and a first end of the second side is coupled with ground; and a second transistor, wherein a base of the second transistor is coupled with a second end of the second side of the transformer, an emitter of the second transistor is coupled with ground, and a collector of the second transistor is coupled with the second node.

10. The CAN data link of claim 9, wherein the first node includes a CAN controller.

11. The CAN data link of claim 9, wherein the second node includes a transceiver.

12. The CAN data link of claim 11, wherein the second node further includes an isolated voltage supply.

13. A method for providing electrical isolation in a controller area network, the method comprising:
- providing a first and a second node;
- providing a transformer circuit;
- connecting a first end of the transformer circuit to the first node; and
- connecting a second end of the transformer circuit to the second node,
- wherein the step of providing a transformer circuit includes:
- providing a first R-C circuit having a first and a second end, wherein the first end is coupled with the first node;
- providing a first transistor, wherein the second end of the first R-C circuit is coupled with a base of the first transistor and an emitter of the first transistor is coupled with ground;
- providing a second R-C circuit having a first and a second end, wherein the first end of the second R-C circuit is coupled with a collector of the first transistor;
- providing a diode having a first and a second end, wherein the first end of the diode is coupled with the first end of the second R-C circuit and the second end of the diode is coupled with a voltage supply;
- providing a transformer having a first side and a second side, wherein a first end of the first side is coupled with the second end of the diode, a second end of the first side is coupled with the second end of the second R-C circuit, and a first end of the second side is coupled with ground; and
- providing a second transistor, wherein a base of the second transistor is coupled with a second end of the second side of the transformer, a emitter of the second transistor is coupled with ground, and a collector of the second transistor is coupled with the second node.

14. The method of claim 13, wherein the step of providing a first and second node includes providing a CAN controller for handling incoming and outgoing CAN messages.

15. The method of claim 14, wherein the step of providing a first and second node further includes providing an isolated voltage supply.

16. The method of claim 13, wherein the step of providing a first and second node includes providing a transceiver.

* * * * *